(12) United States Patent
Wright et al.

(10) Patent No.: US 11,397,727 B2
(45) Date of Patent: Jul. 26, 2022

(54) PROCESSING LATE ARRIVING AND OUT OF ORDER DATA

(71) Applicant: SHOPIFY INC., Ottawa (CA)

(72) Inventors: Erik Wright, Ottawa (CA); Samy Abidib, Ottawa (CA); Julien Letrouit, Verdun (CA)

(73) Assignee: SHOPIFY INC., Ottawa (CA)

( * ) Notice: Subject to any disclaimer, the term of this patent is extended or adjusted under 35 U.S.C. 154(b) by 546 days.

(21) Appl. No.: 16/429,192

(22) Filed: Jun. 3, 2019

(65) Prior Publication Data
US 2020/0379978 A1    Dec. 3, 2020

(51) Int. Cl.
*G06F 16/23*    (2019.01)

(52) U.S. Cl.
CPC ...... *G06F 16/2379* (2019.01); *G06F 16/2322* (2019.01)

(58) Field of Classification Search
None
See application file for complete search history.

(56) References Cited

U.S. PATENT DOCUMENTS

2009/0287703 A1*  11/2009  Furuya ................ G06F 16/2322

OTHER PUBLICATIONS

Akidau, Tyler, et al., "MillWheel: fault-tolerant stream processing at internet scale", Proc. VLDB Endow. 6, 11 (Aug. 2013), pp. 1033-1044. (Year: 2013).*
Akidau, Tyler, et al., "The dataflow model: a practical approach to balancing correctness, latency, and cost in massive-scale, unbounded, out-of-order data processing", Proc. VLDB Endow. 8, 12 (Aug. 2015), pp. 1792-1803. (Year: 2015).*
Affretti, Lorenzo, "FlowDB: Integrating Stream Processing and Consistent State Management", In Proceedings of the 11th ACM International Conference on Distributed and Event-based Systems (DEBS '17), pp. 134-145. (Year: 2017).*
Xin, Reynold Shi, "Go with the Flow: Graphs, Streaming and Relational Computations over Distributed Dataflow", Thesis, UCB/EECS-2018-26, available at http://www2.eecs.berkeley.edu/Pubs/TechRpts/2018/EECS-2018-26.html (Year: 2018).*
Nienhuis, Ryan, "Writing SQL on Streaming Data with Amazon Kinesis Analytics—Part 2", AWS Big Data Blog, posted Sep. 15, 2016. (Year: 2016).*
Kreps, Jay, "Introducing Kafka Streams: Stream Processing Made Simple", Confluent Stream Processing blog post, posted Mar. 10, 2016. (Year: 2016).*

(Continued)

*Primary Examiner* — Scott A. Waldron

(57) ABSTRACT

Systems and methods for processing out of order data incrementally are provided. A database is maintained containing rows of data, each row of data having a timestamp and pertaining to a transaction, for example in the e-commerce platform. New data for new rows of data is received. At least some of the data is out of order. Each new row of data is processed in the same manner irrespective of whether the row is out of order or in order using a computation graph including at least one execution node configured to perform out-of-order incremental processing. A processing result is output based on the processing, wherein the result is up to date based on data that has been received.

20 Claims, 7 Drawing Sheets

(56) References Cited

OTHER PUBLICATIONS

Thereska, Eno, et al., "Watermarks, Tables, Event Time, and the Dataflow Model", Confluent Stream Processing blog post, posted May 3, 2017. (Year: 2017).*
Narkhede, Neha, et al., "Kafka: The Definitive Guide: Real-Time Data and Stream Processing at Scale", O'Reilly Media, Inc., Jul. 2017 First edition. (Year: 2017).*
Noghabi, Shadi A., et al., "Samza: Stateful Scalable Stream Processing at LinkedIn", 2017 Proceedings of the VLDB Endowment, vol. 10, No. 12, pp. 1634-1645. (Year: 2017).*
Bejeck, William P., Jr., "Kafka Streams In Action: Real-time Apps and Microservices with the Kafka Streams API", Manning Publications, 2018, Chapter 3. (Year: 2018).*

* cited by examiner

E-Commerce Platform | Search | JG John's Apparel / Jonny B. Good

- Home
- Orders
- Products
- Costumers
- Reports
- Discounts
- Apps

SALES CHANNELS ⊕
- Online Store
- Mobile App

View all channels

⚙ Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ▽   Today ▽

TOTAL SALES
$98.00                          Jun 1
                                2 orders
$125
$75
$25
     12am   4pm   8pm   4pm  11pm

TOTAL SALES BY CHANNEL   View dashboard
Online Store                  Jun 1
$0.00                         0 orders Mobile app
$0.00                         0 orders Shopify POS (126 York St.)
$0.00                         0 orders

FIG. 2

| Operation | Timestamp | Shop_ID | User_ID | Page_URL | | | | | 416 |
|---|---|---|---|---|---|---|---|---|---|
| | 01/05/2019: 07:25 | 5 | 27 | URL_1 | | processing result: | | | FALSE |
| | 01/05/2019: 09:25 | 6 | 32 | URL_1 | | processing result: | | | FALSE |
| | 01/05/2019: 12:25 | 7 | 25 | URL_2 | | processing result: | | | FALSE |
| | 02/05/2019: 07:25 | 5 | 27 | URL_1 | | processing result: | | | FALSE |
| | 02/05/2019: 10:15 | 6 | 32 | URL_1 | | processing result: | | | FALSE |
| | 02/05/2019: 03:45 | 7 | 25 | URL_2 | | | | | |

| Operation | Timestamp | Shop_ID | User_ID | Page_URL | | | | | 418 |
|---|---|---|---|---|---|---|---|---|---|
| | 01/05/2019: 07:25 | 5 | 27 | URL_1 | | processing result: | | | FALSE |
| | 01/05/2019: 09:25 | 6 | 32 | URL_1 | | processing result: | | | FALSE |
| + | 01/05/2019: 10:25 | 6 | 32 | URL_1 | | | | | |
| | 01/05/2019: 12:25 | 7 | 25 | URL_2 | | | | | |
| | 02/05/2019: 07:25 | 5 | 27 | URL_1 | | | | | |
| | 02/05/2019: 10:15 | 6 | 32 | URL_1 | | | | | |
| | 02/05/2019: 03:45 | 7 | 25 | URL_2 | | | | | |

| Operation | Timestamp | Shop_ID | User_ID | Page_URL | | | | | 420 |
|---|---|---|---|---|---|---|---|---|---|
| | 01/05/2019: 07:25 | 5 | 27 | URL_1 | | | | | |
| | 01/05/2019: 09:25 | 6 | 32 | URL_1 | | | | | |
| | 01/05/2019: 10:25 | 6 | 32 | URL_1 | | | | | |
| + | 01/05/2019: 11:15 | 6 | 32 | URL_2 | | processing result: | | | TRUE |
| | 01/05/2019: 12:25 | 7 | 25 | URL_2 | | | | | |
| | 02/05/2019: 07:25 | 5 | 27 | URL_1 | | | | | |
| | 02/05/2019: 10:15 | 6 | 32 | URL_1 | | | | | |
| | 02/05/2019: 03:45 | 7 | 25 | URL_2 | | | | | |

FIG. 4

PROCESSING LATE ARRIVING AND OUT OF ORDER DATA

FIELD

The application relates to systems such as e-commerce platforms where timestamped data from multiple sources may arrive out of order or late.

BACKGROUND

In an e-commerce platform, timestamped data can arrive from multiple sources. Some data may arrive late, in the sense that it arrives later than its time stamp by some amount, or out of order, in the sense that it arrives later than other data that has already arrived and has a later timestamp.

Certain operations performed on the data may be affected by the fact that some has arrived out or order or late. Existing approaches to handling out of order are based on windowing, or based on performing the operation again on the entire dataset after the out of order or late arriving data is received, referred to herein as lifetime processing. Windowing includes several sub categories:

(1) late-arriving data (LAD) within the window invalidates the window, causing it to be completely restated; and
(2) no data is processed until the window is closed; some time after that the window is started exactly once.

In both cases, data that arrives beyond the window is lost. The former minimizes latency while trading computational efficiency for tolerance of late arriving data. The latter maximizes computational efficiency while trading latency for tolerance of late arriving data.

The windowing approach results in an inaccurate result that does not take into account all of the data. The lifetime processing approach is very processor intensive, and even as a result is being produced, that result may already be out of date due to the arrival of other new data during the time taken to perform the lifetime processing.

There is a need for a more efficient and flexible way of handling out of order and late arriving data.

SUMMARY

Systems and methods for processing out of order data incrementally are provided. A database or other storage structure is maintained containing rows of data (or other data structure), each row of data having a timestamp and pertaining to a transaction, for example in the e-commerce platform. New data for new rows of data is received. At least some of the data is out of order. Each new row of data is processed in the same manner irrespective of whether the row is out of order or in order using a computation graph including at least one execution node configured to perform out-of-order incremental processing. A processing result is output based on the processing, wherein the result is up to date based on data that has been received. By using execution nodes specifically configured to perform out-of-order data processing, a processing result of the system can always be as accurate/up to date as possible, accounting for all data that has arrived, irrespective of whether some is out of order. This is more efficient in terms of computation expense, and produces a more timely result, than a lifetime processing approach that goes back and reprocesses everything to get an updated result accounting for all data.

According to one aspect of the present invention, there is provided a method of configuring out-of-order incremental processing of data, the method comprising: receiving code in a high level DSL (domain specific language), the DSL having a plurality of nouns and a plurality of verbs; processing the code to produce a computation graph having inputs and execution nodes, wherein the execution nodes are selected from a library of execution nodes that implement the verbs of the DSL, at least some of the execution nodes having out-of-order incremental versions that are configured to perform out-of-order incremental processing, wherein at least one execution node of the computation graph is the out-of-order incremental version of that node.

In some embodiments, the method further comprises: outputting an executable based on the computation graph, the executable configured to perform out-of-order incremental processing of incoming transactions to the extent that the execution nodes in the computation graph are out-of-order incremental versions of the executable nodes, wherein the executable processes new transactions incrementally in a same manner irrespective of whether the transaction is out of order or in order.

Optionally, the executable processes a new transaction by treating the transaction as either an insertion of a row of data, a retraction of a row of data, or a replacement of a row of data.

Optionally, processing the code to produce a computation graph comprises for at least one execution node to be included in the computation graph selecting between at least two of: an in-order incremental processing version of the execution node; an out-of-order incremental processing version of the execution node; and a lifetime processing version of the execution node.

Optionally, processing the code to produce a computation graph further comprises: outputting at least one grouping key that defines at least one input to the computation graph, the grouping key defining rows of data to be processed together by the computation graph.

According to another aspect of the present invention, there is provided a method of processing out-of-order data incrementally, the method comprising: maintaining a database containing rows of data, each row of data having a timestamp and pertaining to a transaction in the e-commerce platform; on an ongoing basis, receiving data for new rows of data, wherein at least some rows of data are out of order in that their timestamps are earlier than rows of data already in the database, and at least some rows of data are in order in that their time stamps are later than all rows of data already in the database; processing each new row of data in a same manner irrespective of whether the row is out of order or in order using a computation graph including at least one execution node configured to perform out-of-order incremental processing; outputting a processing result based on the processing, wherein the result is up to date based on data that has been received.

Optionally, said processing comprises processing each a new row of data by treating the new row of data as either an insertion of a row of data, a retraction of a row of data, or a replacement of a row of data.

In some embodiments, the method further comprises: displaying the processing result that is up to date for a particular time; moving the particular time forward or backwards by receiving input from a scrollbar forming part of a graphical user interface; updating the displayed processing result by performing incremental processing for insertion where the scrollbar is used to move the particular time forward and performing incremental processing for retraction where the scrollbar is used to move the particular time backwards.

In some embodiments, the method further comprises: receiving an input via a graphical user interface to bookmark the processing result at a first time; receiving an input via the graphical user interface to bookmark the processing result at a second time; computing and displaying in the graphical user interface a difference in the processing result at the second time and the processing result at the first time.

In some embodiments, the method further comprises: tracking low-watermarks and historical variability of streams making up data of the transactions; based on the low-watermarks and historical variability, determining which processing results are up-to-date, and which are stale or potentially stale; adjusting a display of the processing result in a graphical user interface to reflect the determination.

In some embodiments, the method further comprises: assigning a probability of a given processing result changing based on the tracked historical variability; adjusting a display of the processing result in a graphical user interface to reflect the assigned probability.

According to another aspect of the present invention, there is provided a system comprising: an interface for receiving code in a high level DSL (domain specific language), the DSL having a plurality of nouns and a plurality of verbs; a DSL compiler or interpreter configured to process the code to produce a computation graph having inputs and execution nodes, wherein the execution nodes are selected from a library of execution nodes that implement the verbs of the DSL, at least some of the execution nodes having out-of-order incremental versions that are configured to perform out-of-order incremental processing, wherein at least one execution node of the computation graph is the out-of-order incremental version of that node.

Optionally, the system is further configured to output an executable based on the computation graph, the executable configured to perform out-of-order incremental processing of incoming transactions to the extent that the execution nodes in the computation graph are out-of-order incremental versions of the executable nodes, wherein the executable processes new transactions incrementally in a same manner irrespective of whether the transaction is out of order or in order.

Optionally, the executable processes a new transaction by treating the transaction as either an insertion of a row of data, a retraction of a row of data, or a replacement of a row of data.

Optionally, the DSL compiler or interpreter is configured to process the code to produce a computation graph by, for at least one execution node to be included in the computation graph, selecting between at least two of: an in-order incremental processing version of the execution node; an out-of-order incremental processing version of the execution node; and a lifetime processing version of the execution node.

Optionally, wherein the DSL compiler or interpreter is configured to process the code to produce a computation graph by outputting at least one grouping key that defines at least one input to the computation graph, the grouping key defining rows of data to be processed together by the computation graph.

According to another aspect of the present invention, there is provided a system comprising: a database containing rows of data, each row of data having a timestamp and pertaining to a transaction; at least one interface for receiving data for new rows of data, wherein at least some rows of data are out of order in that their timestamps are earlier than rows of data already in the database, and at least some rows of data are in order in that their time stamps are later than all rows of data already in the database; an out of data processing engine configured to process each new row of data in a same manner irrespective of whether the row is out of order or in order using a computation graph including at least one execution node configured to perform out-of-order incremental processing, and to output a processing result based on the processing, wherein the result is up to date based on data that has been received.

Optionally, said out of order data processing engine processes each a new row of data by treating the new row of data as either an insertion of a row of data, a retraction of a row of data, or a replacement of a row of data.

Optionally, the system further comprises: a graphical user interface; the system configured to display the processing result on the graphical user interface that is up to date for a particular time; a user interface for receiving user input selecting to move the particular time forward or backwards; the system configured to update the displayed processing result by performing incremental processing for insertion where the user interface is used to move the particular time forward and performing incremental processing for retraction where the scrollbar is used to move the particular time backwards.

Optionally, the system further comprises: a graphical user interface for receiving an input to bookmark the processing result at a first time and for receiving an to bookmark the processing result at a second time; the system configured to compute and display in the graphical user interface a difference in the processing result at the second time and the processing result at the first time.

Optionally, the system is further configured to: track low-watermarks and historical variability of streams making up data of the transactions; based on the low-watermarks and historical variability, determine which processing results are up-to-date, and which are stale or potentially stale; adjust a display of the processing result in a graphical user interface to reflect the determination.

Optionally, the system is further configured to: assign a probability of a given processing result changing based on the tracked historical variability; adjust a display of the processing result in a graphical user interface to reflect the assigned probability.

BRIEF DESCRIPTION OF THE DRAWINGS

Embodiments of the disclosure will now be described with reference to the attached drawings in which:

FIG. 2 is an example of a home page of an administrator, according to one embodiment;

FIG. 4 depicts an example data set at various times;

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The description is focused on implementation of the systems and methods for processing of late arriving data for use in e-commerce platforms. However, it should be understood that the same approach can be applied in other systems that are sensitive to the arrival time of data. In another example, these approaches are applied to streaming systems and services, for example systems for streaming video or music.

Figure 1:
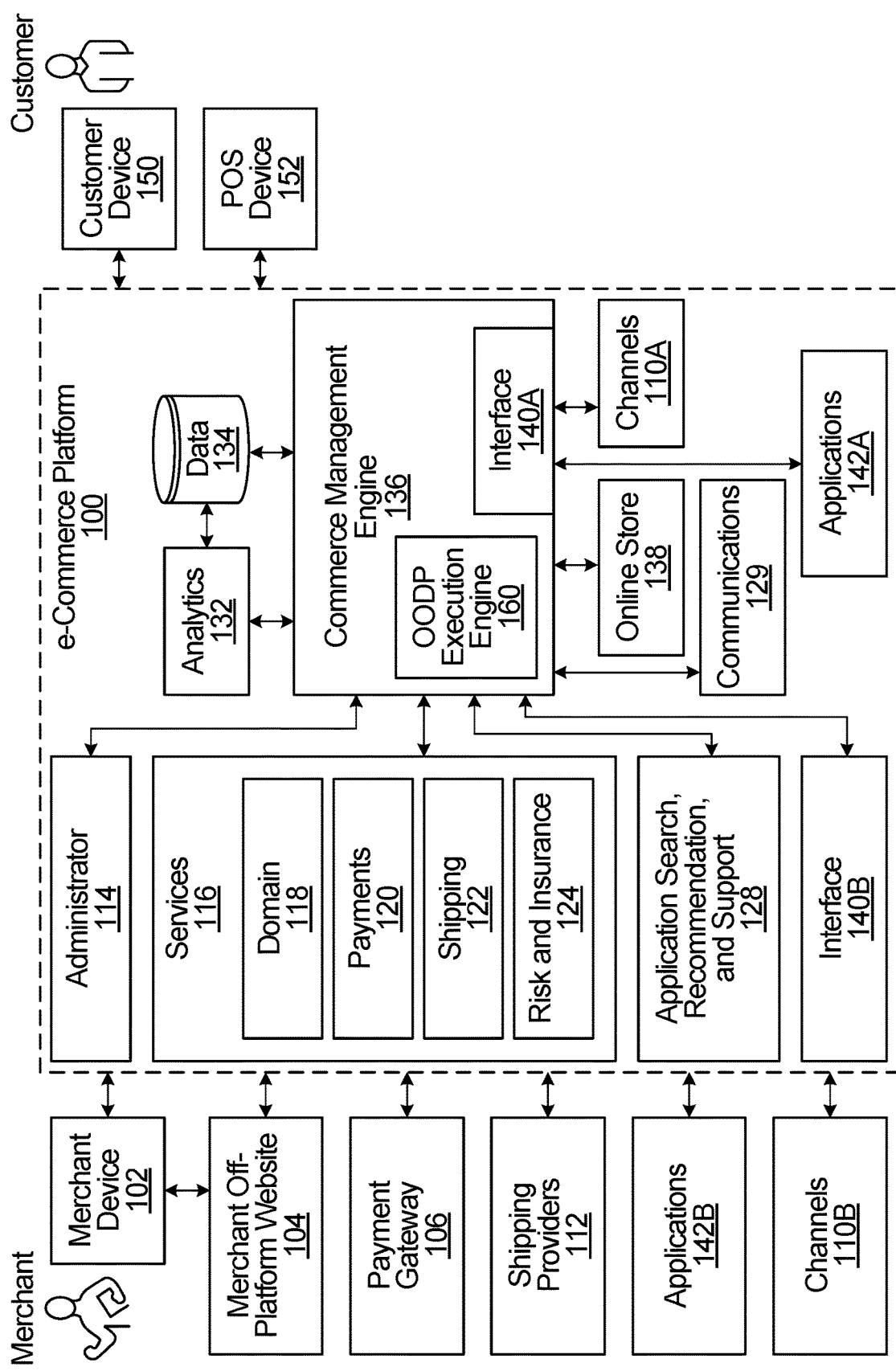
FIG. 1 is a block diagram of an e-commerce platform, according to one embodiment.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's check-out, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The commerce management engine 136 includes an out of order data processing (OODP) execution engine for processing out or order and late arriving data as it arrives, as detailed below. While the OODP execution engine is shown as part of a specific e-commerce platform, more generally, it can be implemented within e-commerce platforms generally. In addition, as described above there are applications of the out of order data processing systems and methods described herein in systems other than e-commerce systems. The OODP, or OODP-like functionality can be implemented within such systems.

Late Arriving or Out of Order Data

The commerce management engine 136 manages data arriving from various different sources and channels and stores this in the data store 134. Various analytics can be performed on the data. For example, the data store 134 may maintain a database containing a respective row for each transaction in the e-commerce platform, via any one of a number of channels. While the term "row" is used for the data that is maintained for each transaction, more generally, any data structure e.g. with one or more data types or elements in any form (e.g. row, column, etc.) can be used to denote data maintained or populated for each transaction, and more generally for each event of whatever event type is being tracked.

While each transaction occurs at an actual point in time, there can be varying delays in getting the information to the data store 134. For example, some sources or channels may go offline from time to time. The result is that data for one event that occurs at a time T1 may arrive later than data for an event that occurred at a time T2 that is later than T1. In this case, the data for the event occurring at time T1 can be viewed as out of order relative to the data that arrives at time T2. In addition, where data for an event is expected to arrive within a certain maximum latency, and then in reality the data arrives outside the maximum latency, the data for the event can be considered late arriving.

The concept of late arriving data applies to data in respect of a single event, such as a transaction, whereas there must be multiple events for the associated data to be considered out of order. However, typically late arriving data will result in an out of order data set, whether other data has arrived in the interim that is not late arriving.

The impact of late arriving or out of order data can vary dramatically, depending on the purpose of the data and/or the processing being applied to the data. For example, if it is of interest to track the number of transactions that occur within a given time window in order to detect potential bot activity, it is not a big problem if the data for some small percentage of transactions arrives late or out of order. Most of the time, the bot detection will occur effectively, and the late arriving or out of order data does not matter. However, for certain business variables being tracked based on the transactions, where there are tangible outcomes that are triggered by certain characteristics of the data, out of order and late arriving data does matter. Two conventional approaches to handling these issues include:

a. Windowing: Place a deadline on when late arriving data will be accepted. This involves only accepting late arriving data that arrives within a certain window. From an efficiency perspective, this is attractive, as once the window is closed, no additional processing is needed. However, this can have an impact on the accuracy of the data. Choosing a longer allowed latency will provide more accurate data, but with higher delay.

b. Lifetime processing: Reprocess all the data from the beginning of time, including taking into account the late arriving/out of order data. This can be very processing intensive and may involve pausing the processing of new data, and going back for several days or weeks to reprocess everything. The complexity of this approach is on the order of the number of rows.

Figure 3:
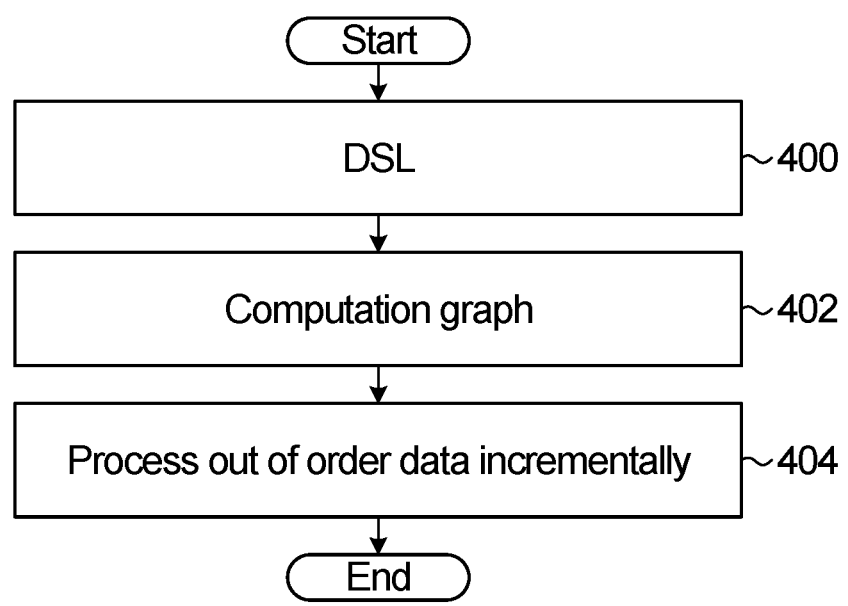
FIG. 3 is a flowchart of a method of processing out of order data provided by an embodiment.

Referring now to FIG. 3, shown is a very high level flowchart of a method provided by an embodiment of the disclosure. The method begins at block 400 with receiving high level domain specific language (DSL) code from a user such as for example, a data scientist, specifying a processing result. DSL code examples are provided below. At 402, the DSL code 400 is processed to produce a computation graph 402 for execution by an execution engine. The DSL code may, for example, be processed by a DSL compiler, or a DSL interpreter, or more generally any system that can process the DSL code and produce the computation graph. At least some of the execution nodes of the computation graph 402 are specifically designed to be able to handle out of order data although this may be transparent to the data scientist. In addition, since no windowing is performed for nodes handling out of order data, data that might otherwise be considered late is also handled, and as such no data is late from the perspective of such execution nodes. More specifically, the DSL compiler is aware of how to do what the data scientist asked in the form of the DSL code, knows how to lay out data, understands data persistence requirements, and how to process out of order data, and knows what needs to be stored, for example in terms of intermediate results, to make processing efficient. At 404, the execution engine processes incoming data with incremental out of order data processing using the computation graph, as will be described in detail below. The execution engine may, for example, be part of the commerce management engine 136 as shown in FIG. 1, which shows out of order data processing (OODP) execution engine 160.

Domain Specific Language

A domain specific language (DSL) is provided, which is a high level language for users such as data scientists to express processing they want to be performed. The DSL includes a set of nouns, and a set of verbs, also referred to herein as operations. The nouns can, for example, be events or entities. For entities, there are two ways of representing their data: as entity snapshots or as a series of entity updates. A specific example set of nouns includes Timestamp; Shop_ID; User_ID; Page_URL, but generally the nouns will be implementation specific. The composition of code in the DSL is independent of an actual data set.

A dataset describes many instances of a noun and may also describe how those instances change over time and/or include observations with subsequent corrections to be applied to those observations. For each observation/instance of an entity, the dataset will include a unique key along with the observed properties. A timestamp may also be included. For each event there will be a timestamp along with the observed properties. A specific example of an entity would be a Product (key: product ID, observations: title, category ID, weight, MSRP). A specific example of an event would be a Package Shipped Event (observations: package contents, order ID, shipping address, carrier, . . . ).

The data in the dataset is stored with a table (or tables) having a well-defined structure. As compared to a typical relational database where there are user-specified columns but the semantics of those columns are not understood by the system, in the data set used in this embodiment, the structure of the table is clearly divided into keys (or identifiers) and payload. For events and update streams, the timestamp of the observation is also well-defined in the sense that the timestamp is a system defined field, as opposed to a user defined field. With a system defined timestamp field, the system is preconfigured to be aware of the meaning of time stamp, and what it means for a time stamp be earlier or later, or within a specific window, for example.

Note that for the purpose of this description, the table differs from the data set in that the table is what is left after collapsing of the data in the data set allowing for insertions, retractions, and replacements.

For change streams (which include insertions and retractions of observations) the operation (insertion/retraction) is also well-defined. Embodiments of the invention use these well-defined columns.

A verb is any kind of operation that operates either on a single row or on groups of rows. A group of rows may include all the rows in a data set, or may be defined by a grouping key. A row may contain nouns, with a verb operating on certain nouns in a row. Specific examples of verbs include:

Aggregate:
Count:
Total:
Join:
Window:
Threshold

But more generally, the set of operations will be implementation specific. Using the DSL, a data scientist can specify a processing result in the form of DSL code that includes of operations performed upon nouns.

OODP Execution Engine

This DSL code is used by the compiler/interpreter to configure an OODP execution engine in the form of a computation graph having inputs and execution nodes. For each DSL operation, there may be one or more selected execution nodes configured to perform the DSL operation in the the execution engine. That is to say, there may not necessarily be a one-to-one correspondence between the DSL operations and the execution nodes in the execution engine.

For use in constructing the computation graph, there is a library of execution nodes that includes execution node(s) that are available for each operation including at least one of:

a. An in-order incremental version of an execution node
b. An out-of-order incremental version of an execution node
c. A lifetime processing version of an execution node The execution nodes used to form the computation graph, can include some execution nodes that are in-order incremental versions, some out-of-order incremental version, and some lifetime processing versions. In some embodiments, where multiple versions are available, the compiler selects the most appropriate version to include in the computation graph.

Whether a DSL operation is implemented as in-order incremental, out-of-order incremental, or lifetime processing depends on the versions of the selected execution nodes that are included in the computation graph.

The in-order incremental version of the operation is only capable of processing data in order. For example, this may involve using a windowing operation.

The out-of-order incremental version of the operation treats all data the same, such that the most up to date output is available at any time as soon as the operation is performed. Effectively, all data is treated as though it is out of order, but it is processed to completion as it arrives.

In some embodiments, out-of-order incremental versions of a specific set or library of operations are implemented in the execution engine. The set of operations for which out-of-order incremental versions are implemented may be expanded over time. Advantageously, this allows for a system to be delivered incrementally, including more and more out-of-order incremental versions of operations over time. This allows a simpler initial implementation compared to attempting to build an entire framework in which every possible operation has an out-of-order incremental version. The lifetime processing version always produces the correct result, at great expense. In-order will produce the same correct result once the same data has been processed, assuming it arrives in order. The out-of-order incremental version will produce the same correct result once the same data has been processed, regardless of the order the data arrives.

With the lifetime processing version of the operation, each execution goes back to the beginning of time, or as far back as we care to report on, whether there is late arriving data or not. The results are generated from scratch each time. The cost is related to the total amount of data collected. Note that an in-order processing version _may_ handle late arriving data by rewinding to the time of (or a time before) the late arriving data timestamp. The cost is proportional to the lateness of the data (later data means more reprocessing). In contrast, the out-of-order version does not need to rewind and the cost should typically be related to the amount of late arriving data, regardless of how late it is.

In some embodiments, the computation graph breaks up each condition of each step specified in the DSL into a respective execution node. So there can be multiple execution nodes generated based on one DSL operation.

Rather than dealing with a dataset as a whole containing rows and data, in accordance with an embodiment of the disclosure, out-of-order processing is performed based on insertion, and retraction and replacement operations. It is noted that for in-order incremental processing and lifetime processing, insertions, retractions, and replacements are not relevant. As described above, for in-order incremental, the system simply deals with incoming observations to the extent they are in-order. For lifetime processing, the system re-evaluates the complete set of observations A use case example of out-of-order processing will now be described in detail, for rows of data having the form shown in FIG. 4. Each row of data represents a transaction, and has a timestamp, which includes date and time, Shop_ID, user_ID and Page_URL. New rows of data are inserted as they arrive.

More generally, a row can be:
inserted, which is referred to as a "+" operation;
retracted, which is referred to as a "−" operation;
replaced, which is referred to as a "−/+" operation.

The data set 410 at some initial point in time for the purpose of this example is at the top of FIG. 4, and includes 6 rows. The data set 412 at a first later time is shown in the middle of FIG. 4 and includes 7 rows, with the third row having been inserted. The third row is late arriving, since it is arriving later in time than other rows with later timestamps. The data set 412 at a second later time is shown at the bottom of FIG. 4 and includes 8 rows, with the fourth row having been inserted. The fourth row is also late arriving.

For this use case, the user is interested in identifying situations where the number of transactions having the same Shop_ID and Page_URL that occur on the same date is greater than a threshold amount=3. For example, some business reward may be generated for a shop that succeeds in this level of transaction activity.

It can be seen that in the first data set 410 and data set 412 at the first later time, this situation is not true for any {Shop_ID,Page_URL} pair. It can also be seen that for the data set 414 at the second later time, this situation is true for {Shop_ID,Page_URL}={6, URL_1} on the date Jan. 5, 2019.

Figure 5:
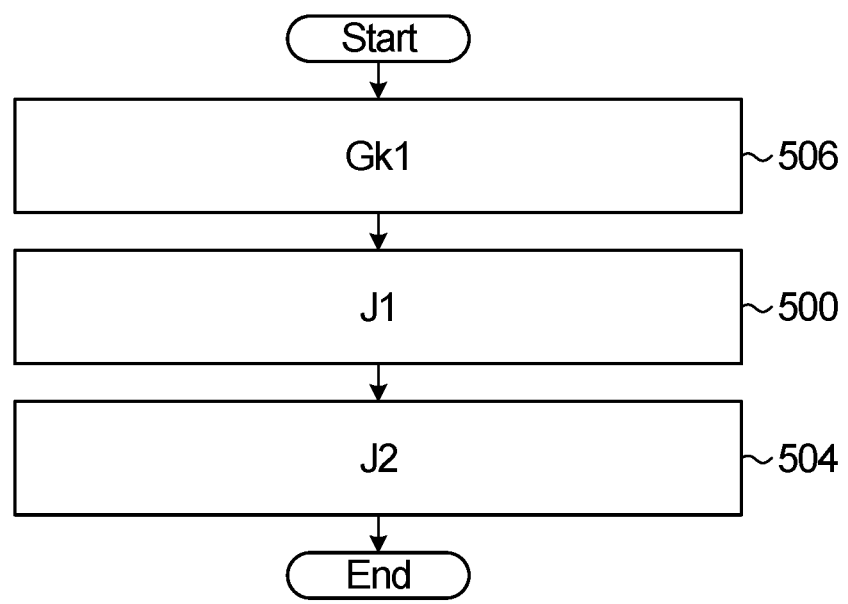
FIG. 5 depicts an example of a computation graph.

Referring now to FIG. 5, shown is a specific example of a computation graph for this use case. The computation graph includes 2 operation nodes J1 500, J2 502. The input to the operation node J1 500 is defined by a first grouping key GK1 506. The output of operation node J1 500 is input to operation node J2 504. More generally, for other use cases, the computation graph may include any number of nodes, and nodes may have multiple inputs. For example, there may be a computation node may have multiple data inputs, and a computation node may receive the output of multiple other computation nodes.

The processing path from GK1 506 to J1 500 to J2 504 will be described by way of example. More generally, a computation graph may have multiple processing paths.

The first grouping key GK1 506 groups rows by transaction time that have the same date, Shop_ID and Page_URL.

Node J1 500 is a count node which counts how many rows in a group of rows determined by the grouping key GK1 (i.e. rows that have transaction time with the same date, and have the same Shop_ID and page_URL).

Node J2 is a threshold node, which determines whether the number or rows determined by the count node J1 is greater than a threshold, in this case 3.

Initially, the processing result for any combination of Shop_ID, Page_URL is false for data set 410 as indicated at 416. Note the processing results do not form part of the data set. After insertion of the third row to produce dataset 412, this is an insertion operation, and the grouping key knows that data for Jan. 5, 2019, Shop_ID=6, and URL_1 needs to be re-processed. Because the grouping key is grouping by date, Shop_ID, and URL_ID, the grouping key also knows that the data for other dates, and for the same date but different Shop_ID, URL_ID is not affected by this insertion, and so the computation graph need not be re-executed for such data.

The computation graph is re-executed for the group of transactions on Jan. 5, 2019, having shop_ID=6, and URL_1, and this produces a count of 2 in J1 500, and a failure of the threshold in J2 504. The processing result for these rows is indicated at 418 in FIG. 3.

After insertion of the fourth row to produce dataset 414, the grouping key knows that data for Jan. 5, 2019, shop_ID=6, and URL_1 needs to be re-processed. The computation graph is executed for the group of transactions on Jan. 5, 2019, having shop_ID=6, and URL_1, and this produces a count of 3 in J1 500, and a success of the threshold in J2 504. The processing result for these rows is indicated at 620.

When the threshold is satisfied, node J2 outputs {Shop_ID, Page_URL} that satisfied the threshold, and in this case, will output {Shop_ID=6, Page_URL=URL_1} which is then used as a basis for generating the business reward.

It can be seen that as new rows are added to the data set, there is no difference to how they are processed. All data is treated the same by the computation graph. New, late arriving data is folded into the processing results for the entire data set immediately as it arrives.

It should be understood that the description above provides a specific example of how the out-of-order incremental version of this operation could be implemented. However, it should be understood that other implementations are possible. For example, in this case, the operation concerns counting something on a date. Instead of re-evaluating all data for a date, another option would be to maintain a counter for each date/shop/url. This count could be incremented/decremented with each insertion/retraction. This has the advantage of not needing to look at all data for the affected date/shop/url but has the disadvantage of needing to maintain a count for each date/shop/url whether or not it has met the threshold. Both options could be available, with the user or the system choosing which to execute (based, for example, on the frequency of late arriving data and the number of records in each group). In some embodiments, a hybrid is implemented where the count is maintained for recent data that is considered volatile but discarded for older data (necessitating reprocessing of the group for unusually LAD).

In some embodiments, the processing result is output to a graphical user interface.

In some embodiments, a processing result is presented in a graphical user interface as a function of time, wherein the time is selected on a scrollbar. As a result, by performing scrolling with the scrollbar, the evolution of the processing result is depicted. This involves determining the processing result for the earliest time on the scrollbar, possibly this being a time before the earliest transaction. Alternatively, the starting point can be a snapshot of the processing result for an earlier time that has been saved. Then, as the scrollbar is moved, the incremental processing is applied to that result for transactions that occur within the time range reflected by the movement of the scrollbar.

More particularly, this method can involve the following steps:
displaying the processing result that is up to date for a particular time;
moving the particular time forward or backwards by receiving input from a scrollbar forming part of a graphical user interface;
updating the displayed processing result by performing incremental processing for insertion where the scrollbar is used to move the particular time forward and performing incremental processing for retraction where the scrollbar is used to move the particular time backwards.

Advantageously, with the provided systems and methods, it is possible to produce the best result possible at any time based on the available data. If data does come in later, the results are corrected at that time. In some embodiments, results can be bookmarked, with the produced result having a timestamp of when it was produced. It is possible to measure a delta in results between two bookmarks.

More particularly, this method can involve the following steps:
receiving an input via a graphical user interface to bookmark the processing result at a first time;
receiving an input via the graphical user interface to bookmark the processing result at a second time;
computing and displaying in the graphical user interface a difference in the processing result at the second time and the processing result at the first time.

Figure 6:
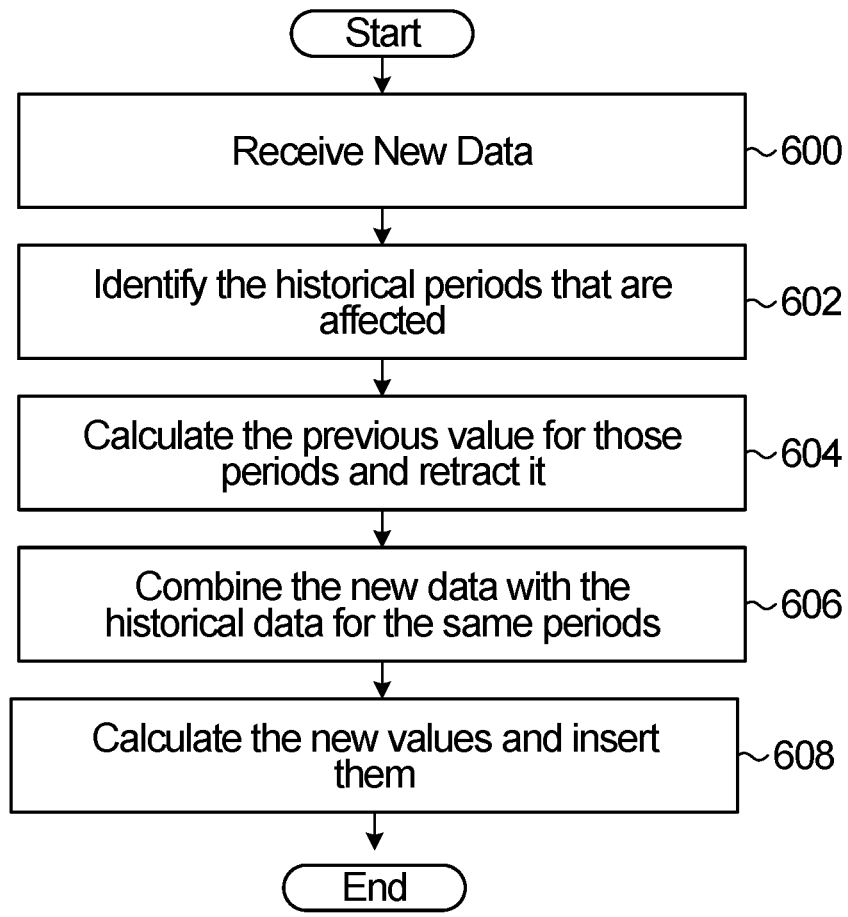
FIG. 6 is a flowchart of an example out of order processing for an aggregation operation.

Referring now to FIG. 6, shown is a flowchart of an example out-of-order incremental version of a daily average by shop. The objective here is to determine a daily average of a particular quantity (also referred to as a "fine grained fact"), per day, for a given shop. The average is an example of an "aggregated fact".

Figure 7:
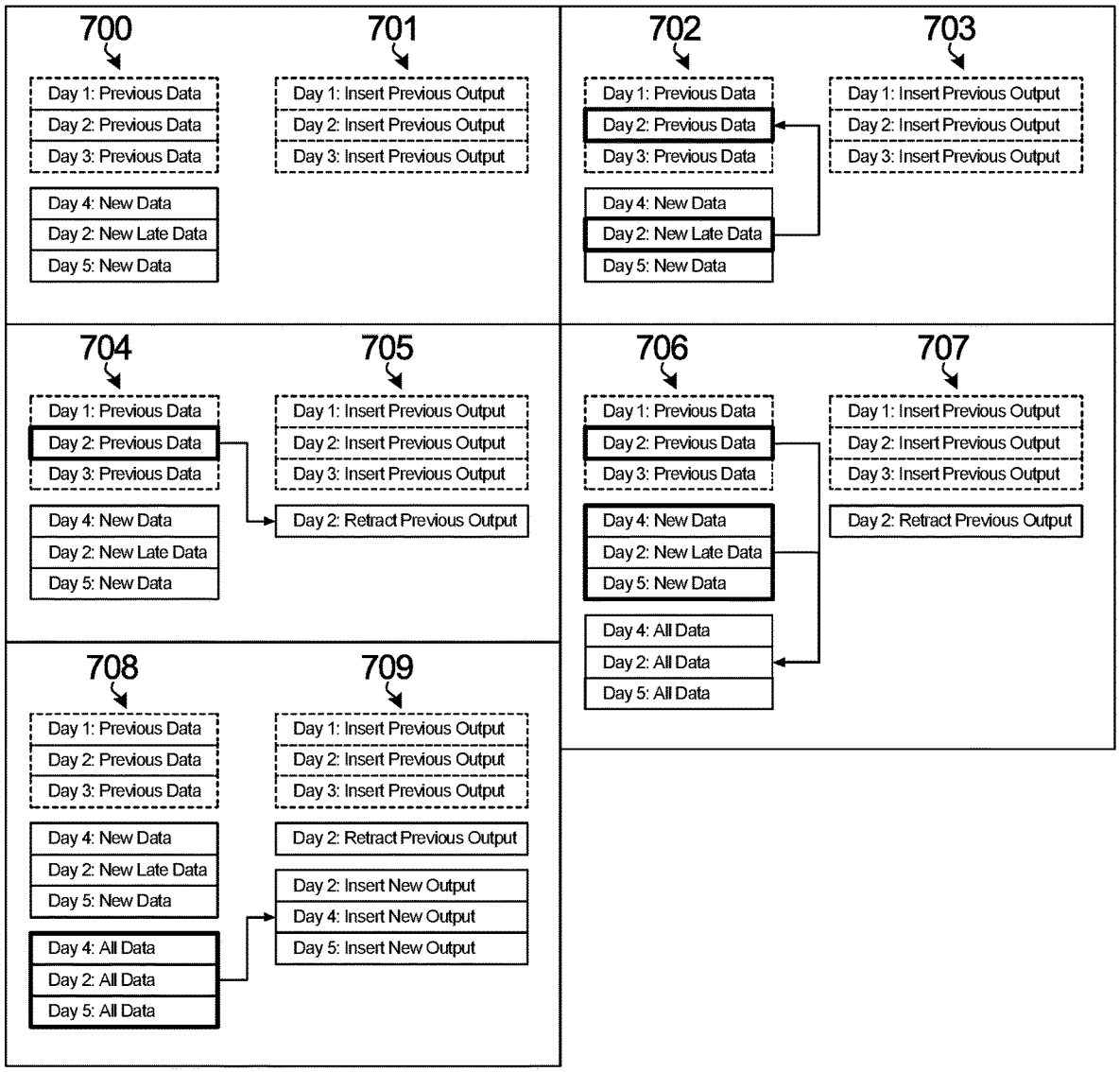
FIG. 7 shows a specific example of out of order processing using the method of FIG. 6.

FIG. 6 will described in detail, with reference to a specific example depicted in FIG. 7. FIG. 7 shows the corresponding sets of fine-grained facts partitioned by day (left hand column) and insertions/retractions of aggregated facts after each block of the method of FIG. 6. FIG. 7 shows:
fine grain facts partitioned by day 700, and insertions/retractions 701 after step 600;
fine grain facts partitioned by day 702, and insertions/retractions 703 after step 602;
fine grain facts partitioned by day 704, and insertions/retractions 705 after step 604;
fine grain facts partitioned by day 706, and insertions/retractions 707 after step 606; and
fine grain facts partitioned by day 708, and insertions/retractions 709 after step 608.

In the illustrated example, prior to new data arriving in respect of current processing, there are some fine grained facts already in the system, shown as D1: Previous Data, Day 2: Previous Data, and Day 3: Previous Data. Also shown are insertions that have already taken place, including D1: Insert Previous Output, Day2: Insert Previous Output, and D3: Insert Previous Output.

The method begins at block 600 with the receipt of new data. Each new data will have an associated timestamp to the resolution of at least date. Turning now to FIG. 7, following block 600, fine grain facts partitioned by day 700 includes Day 4: New Data; Day 2: New Late Data; and D5: New Data.

The method continues at block 602 with identifying the historical periods that are affected by the arrival of new data. Historical periods are periods for which aggregates have already been calculated but where the results are potentially invalidated by the incoming late-arriving data. Referring to FIG. 7, it can be seen that Day 2 is a historical period that is affected by the arrival of the new data.

The method continues at block 604 with calculating the previous value for those periods and retracting them. Referring to FIG. 7, this involves calculating the previous value for D2 and retracting it. This is shown at 705 with Day 2: Retract Previous Output. In order to be able to calculate the previous value, the data may be stored in manner that allows it to be quickly accessed by date.

This is also needed for the next step (606 "combining the new data with the historical data"). In an alternative implementation, the previous output might still be readily available, in which case the value to retract might be easily accessible without recalculation. In other alternative implementations, where no downstream user needs to take into account the retracted value in order to correct its own results, the emission of retractions could be replaced with the emission of inserts and deletes.

The method continues in block 606 with combining the new data with the historical data for the same affected periods. This is depicted in FIG. 7 at 706, where the combined data is indicated as Day 4: All data, Day 2: All Data and Day 5: All Data.

The method continues in block 608 with the calculation and insertion of new values. This is depicted in FIG. 7, with Day2: Insert New Output, Day4: Insert New Output, Day 5: Insert New Output.

It can be seen that the cost of processing late arriving data is proportional to the amount of data received in the typical late arriving data window.

In some embodiments, for any of the methods described herein, further steps are taken to track low-watermarks and historical variability of streams making up data of the transactions. Based on the low-watermarks and historical variability, a determination is made of which processing results are up-to-date, and which are stale or potentially stale. A display of the processing result in a graphical user interface is adjusted to reflect the determination. In a specific example, processing results are presented with colour coding that reflects whether the result is up to date, or stale.

In some embodiments, a probability of a given processing result changing is assigned based on the tracked historical variability. The display of the processing result in a graphical user interface is adjusted to reflect the assigned probability. In a specific example, processing results are presented with colour coding that reflects the computed probability, based on the tracked historical variability, that a given processing result will change.

Numerous modifications and variations of the present disclosure are possible in light of the above teachings. It is therefore to be understood that within the scope of the appended claims, the disclosure may be practiced otherwise than as specifically described herein.

The invention claimed is:

1. A computer-implemented method of configuring out-of-order incremental processing of data, the method comprising:
   receiving code in a high level DSL (domain specific language), the DSL having a plurality of nouns and a plurality of verbs;
      processing the code to produce a computation graph having inputs and execution nodes, wherein the execution nodes are selected from a library of execution nodes that implement the verbs of the DSL, at least some of the execution nodes having out-of-order incremental versions that are configured to perform out-of-order incremental processing, wherein at least one execution node of the computation graph is the out-of-order incremental version of that node; and
      outputting an executable based on the computation graph, the executable configured to perform out-of-order incremental processing of incoming transactions to the extent that the execution nodes in the computation graph are out-of-order incremental versions of the executable nodes, wherein the executable processes new transactions incrementally in a same manner irrespective of whether the transaction is out of order or in order.

2. The computer-implemented method of claim 1 wherein the executable processes a new transaction by treating the transaction as either an insertion of a row of data, a retraction of a row of data, or a replacement of a row of data.

3. The computer-implemented method of claim 1 wherein:
   processing the code to produce the computation graph comprises for at least one execution node to be included in the computation graph selecting between at least two of:
   an in-order incremental processing version of the execution node;
   an out-of-order incremental processing version of the execution node; and
   a lifetime processing version of the execution node.

4. The computer-implemented method of claim 1 wherein processing the code to produce the computation graph further comprises:
   outputting at least one grouping key that defines at least one input to the computation graph, the grouping key defining rows of data to be processed together by the computation graph.

5. A computer-implemented method of processing out-of-order data incrementally, the method comprising:
   maintaining a database containing rows of data, each row of data having a timestamp and pertaining to a transaction in an e-commerce platform;
   on an ongoing basis, receiving data for new rows of data, wherein at least some rows of data are out of order in that their timestamps are earlier than rows of data already in the database, and at least some rows of data are in order in that their time stamps are later than all rows of data already in the database;
   processing each new row of data in a same manner irrespective of whether the row is out of order or in order using a computation graph including at least one execution node configured to perform out-of-order incremental processing;
   outputting a processing result based on the processing, wherein the result is up to date based on data that has been received.

6. The computer-implemented method of claim 5 wherein said processing comprises processing each new row of data by treating the new row of data as either an insertion of a row of data, a retraction of a row of data, or a replacement of a row of data.

7. The computer-implemented method of claim 5 further comprising:
   displaying the processing result that is up to date for a particular time;
      moving the particular time forward or backwards by receiving input from a scrollbar forming part of a graphical user interface;
      updating the displayed processing result by performing incremental processing for insertion where the scrollbar is used to move the particular time forward and performing incremental processing for retraction where the scrollbar is used to move the particular time backwards.

8. The computer-implemented method of claim 5 further comprising:
   receiving an input via a graphical user interface to bookmark the processing result at a first time;
   receiving an input via the graphical user interface to bookmark the processing result at a second time;
   computing and displaying in the graphical user interface a difference in the processing result at the second time and the processing result at the first time.

9. The computer-implemented method of claim 5 further comprising:
   tracking low-watermarks and historical variability of streams making up data of the transactions;
   based on the low-watermarks and historical variability, determining which processing results are up-to-date, and which are stale or potentially stale;
   adjusting a display of the processing result in a graphical user interface to reflect the determination.

10. The computer-implemented method of claim 9 further comprising:
    assigning a probability of a given processing result changing based on the tracked historical variability;
    adjusting a display of the processing result in a graphical user interface to reflect the assigned probability.

11. A system comprising:
    an interface for receiving code in a high level DSL (domain specific language), the DSL having a plurality of nouns and a plurality of verbs;
    at least one processor configured to:
       process the code to produce a computation graph having inputs and execution nodes, wherein the execution nodes are selected from a library of execution nodes that implement the verbs of the DSL, at least some of the execution nodes having out-of-order incremental versions that are configured to perform out-of-order incremental processing, wherein at least one execution node of the computation graph is the out-of-order incremental version of that node;
    output an executable based on the computation graph, the executable configured to perform out-of-order incremental processing of incoming transactions to the extent that the execution nodes in the computation graph are out-of-order incremental versions of the executable nodes, wherein the executable processes new transactions incrementally in a same manner irrespective of whether the transaction is out of order or in order.

12. The system of claim 11 wherein the executable processes a new transaction by treating the transaction as either an insertion of a row of data, a retraction of a row of data, or a replacement of a row of data.

13. The system of claim 11 wherein the at least one processor is further configured to
process the code to produce the computation graph by, for at least one execution node to be included in the computation graph, selecting between at least two of:
an in-order incremental processing version of the execution node;
an out-of-order incremental processing version of the execution node; and
a lifetime processing version of the execution node.

14. The system of claim 11 wherein the at least one processor is further configured to process the code to produce the computation graph by outputting at least one grouping key that defines at least one input to the computation graph, the grouping key defining rows of data to be processed together by the computation graph.

15. A system comprising:
a database containing rows of data, each row of data having a timestamp and pertaining to a transaction;
at least one interface for receiving data for new rows of data, wherein at least some rows of data are out of order in that their timestamps are earlier than rows of data already in the database, and at least some rows of data are in order in that their time stamps are later than all rows of data already in the database;
at least one processor configured to:
process each new row of data in a same manner irrespective of whether the row is out of order or in order using a computation graph including at least one execution node configured to perform out-of-order incremental processing, and to output a processing result based on the processing, wherein the result is up to date based on data that has been received.

16. The system of claim 15 wherein said at least one processor is further configured to process each new row of data by treating the new row of data as either an insertion of a row of data, a retraction of a row of data, or a replacement of a row of data.

17. The system of claim 15 further comprising:
a graphical user interface;
the at least one processor further configured to display the processing result on the graphical user interface that is up to date for a particular time;
a user interface for receiving user input selecting to move the particular time forward or backwards;
the at least one processor further configured to update the displayed processing result by performing incremental processing for insertion where the user interface is used to move the particular time forward and performing incremental processing for retraction where the scrollbar is used to move the particular time backwards.

18. The system of claim 15 further comprising:
a graphical user interface for receiving an input to bookmark the processing result at a first time and for receiving an input to bookmark the processing result at a second time;
the at least one processor further configured to compute and display in the graphical user interface a difference in the processing result at the second time and the processing result at the first time.

19. The system of claim 15, wherein the at least one processor is further configured to:
track low-watermarks and historical variability of streams making up data of the transactions;
based on the low-watermarks and historical variability, determine which processing results are up-to-date, and which are stale or potentially stale;
adjust a display of the processing result in a graphical user interface to reflect the determination.

20. The system of claim 19, wherein the at least one processor is further configured to:
assign a probability of a given processing result changing based on the tracked historical variability;
adjust a display of the processing result in a graphical user interface to reflect the assigned probability.

* * * * *